(12) United States Patent
Ardhanari et al.

(10) Patent No.: US 8,935,508 B1
(45) Date of Patent: Jan. 13, 2015

(54) IMPLEMENTING PSEUDO CONTENT ACCESS MEMORY

(75) Inventors: Sivakumar Ardhanari, Chennai (IN); Srihari Adem, Nellore (IN)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 12/870,927

(22) Filed: Aug. 30, 2010

(51) Int. Cl.
*G06F 17/30* (2006.01)

(52) U.S. Cl.
CPC .... *G06F 17/30961* (2013.01); *G06F 17/30949* (2013.01)
USPC .......................................... 711/216; 707/797

(58) Field of Classification Search
None
See application file for complete search history.

(56) References Cited

U.S. PATENT DOCUMENTS

| | | | | |
|---|---|---|---|---|
| 5,414,704 | A * | 5/1995 | Spinney | 370/389 |
| 6,434,662 | B1 * | 8/2002 | Greene et al. | 711/108 |
| 6,633,879 | B1 * | 10/2003 | Jeffries | 707/719 |
| 6,754,662 | B1 * | 6/2004 | Li | 707/693 |
| 7,039,641 | B2 * | 5/2006 | Woo | 370/400 |
| 7,107,265 | B1 * | 9/2006 | Calvignac et al. | 1/1 |
| 2004/0255045 | A1 * | 12/2004 | Lim et al. | 709/245 |
| 2007/0088854 | A1 * | 4/2007 | Park et al. | 709/250 |
| 2007/0234005 | A1 * | 10/2007 | Erlingsson et al. | 711/216 |
| 2010/0306222 | A1 * | 12/2010 | Freedman et al. | 707/759 |
| 2011/0307447 | A1 * | 12/2011 | Sabaa et al. | 707/637 |

OTHER PUBLICATIONS

Yedidyah Langsam et al. Data Structures Using C and C++. Dec. 2000. Prentice Hall of India. 2nd ed. pp. 206-211 and 401-421.*
Christian Mandl et al. "A fast FPGA based Coprocessor supporting hard Real-Time Search." Sep. 1997. IEEE. EUROMICRO 97. pp. 499-506.*
Yedidyah Langsam et al. Data Structures Using C and C++. Dec. 2000. Prentice Hall of India. $2_{nd}$ ed. pp. 422-467.*
Vlastimil Havran. "Cache Sensitive Representation for BSP Trees." Dec. 1997. Compugraphics '97.*

* cited by examiner

*Primary Examiner* — Nathan Sadler
(74) *Attorney, Agent, or Firm* — DeLizio Gilliam, PLLC

(57) ABSTRACT

A pseudo CAM (PCAM) can be implemented using SRAM to minimize latency associated with a traditional CAM. On receiving a key at a memory controller that executes operations on the PCAM, a hash value of the received key can be calculated. Based on the hash value of the received key, one of a plurality of memory sub-trees comprising a subset of memory locations, that is associated with the received key can be identified. A binary search can be executed on the subset of memory locations that constitute the identified memory sub-tree to identify a memory location at which a data entry comprising the received key is stored. The data entry comprising the received key and corresponding content can then either be retrieved or deleted. Alternatively, a binary search can be executed to identify the memory location where a new data entry comprising the received key should be stored.

20 Claims, 8 Drawing Sheets

IMPLEMENTING PSEUDO CONTENT ACCESS MEMORY

BACKGROUND

Embodiments of the inventive subject matter generally relate to the field of memory access and, more particularly, to techniques for implementing pseudo content access memory. Content access memory (CAM), unlike random access memory (RAM), is designed so that a data entry in the CAM is stored as a combination of a key and corresponding content. In response to receiving a key, data entries in the CAM are searched to identify content that corresponds to the key. A data entry can be added to the CAM by storing a combination of a new key and new corresponding content in the CAM so that the new key/content can be subsequently queried. A data entry can also be removed from the CAM by deleting a combination of a key and the corresponding content.

SUMMARY

Various embodiments for implementing a memory subsystem in a computer system are disclosed. In one embodiment, a hash value of a key received at a memory controller associated with a memory unit of the memory subsystem is calculated. Based on the hash value of the key, a first of a plurality of memory sub-trees associated with the key is identified. Each of the plurality of memory sub-trees is a logical group of a subset of memory locations that constitute the memory unit. A binary search is executed on the first of the plurality of memory sub-trees to identify a first memory location that comprises a key that matches the received key and content that corresponds to the matching key. The content that corresponds to the matching key that is stored at the first memory location associated with the first of the plurality of memory sub-trees is processed.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
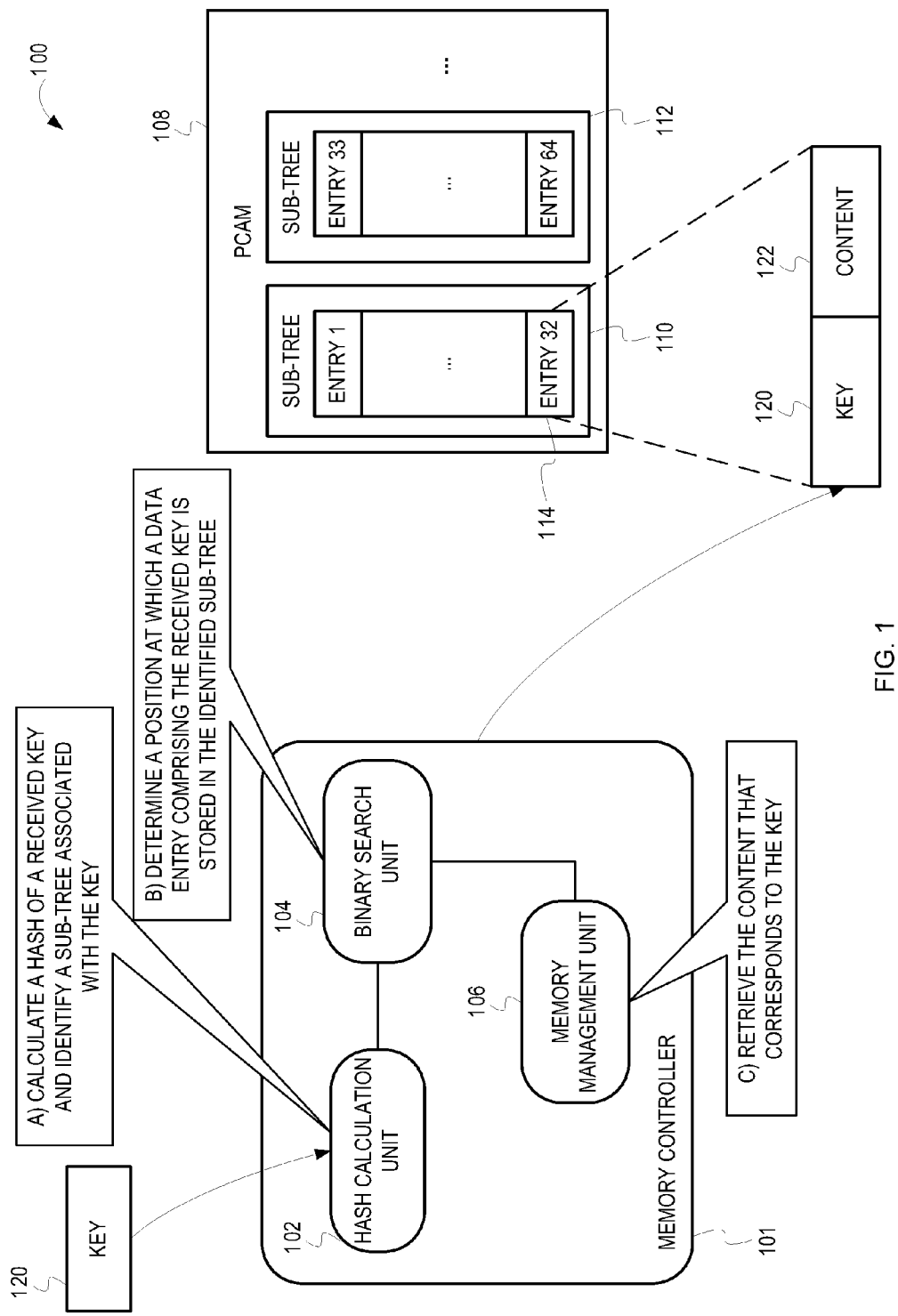
FIG. 1 is an example conceptual diagram illustrating example operations for data entry access in a pseudo content access memory (PCAM)

The description that follows includes exemplary systems, methods, techniques, instruction sequences, and computer program products that embody techniques of the present inventive subject matter. However, it is understood that the described embodiments may be practiced without these specific details. For instance, although examples refer to static random access memory (SRAM) being used to implement a pseudo content access memory (PCAM), in other implementations other suitable types of RAM (e.g., dynamic RAM (DRAM)) may be used to implement the PCAM. In other instances, well-known instruction instances, protocols, structures, and techniques have not been shown in detail in order not to obfuscate the description.

In a content access memory (also referred to as content-addressable memory) (CAM), a hash-based search technique or a sorted tree-based search technique can be used to identify a data entry in the CAM, or to determine a position in the CAM where a new data entry should be stored. However, traditional CAMs do not have a bounded latency, which can make it difficult to predict performance of the CAM. The hash-based search technique uses a hash value of a received key to identify a sub-tree associated with the received key. The received key is sequentially compared against each of the keys in the sub-tree to identify the requisite content or to identify a position where the received key and its corresponding content should be stored. For the hash-based search technique, the maximum look-up latency is directly influenced by the number of data entries per memory sub-tree of the CAM (e.g., 64 data entries per memory sub-tree results in a maximum latency of 64 clock cycles). The maximum look-up latency is not deterministic because data entries are typically not uniformly distributed among the memory sub-trees. Also, the hash-based search technique usually requires a large number of pointers and linked lists to be stored, and therefore can result in increased memory usage. A large variation in the size of the memory sub-trees can lead to a highly complex CAM implementation. In the sorted tree based search technique, the CAM is organized as a sorted tree (e.g., a binary tree) and sorted search algorithms (e.g., binary search algorithms) are executed to identify the key and the corresponding content. In the sorted tree-based search technique, the latency associated with the addition/deletion of the data entries in the CAM depends on the number of data entries in the CAM and is neither deterministic nor constant. For example, for a CAM with N data entries, adding the data entry to the beginning of the CAM results in latency of the order of N as the other data entries need to be shifted down. This in turn can affect the latency of other requests (e.g., data entry lookup) received while the addition/deletion operations are in progress. A non-deterministic latency can also increase the complexity of the CAM implementation. For example, for a CAM implemented on a network router, the maximum packet arrival rate determines the maximum latency that can be tolerated.

A type of CAM can be implemented using single port or dual port static random access memory (SRAM) in hardware with digital logic. Such a type of CAM realized using SRAM is referred to herein as a pseudo CAM (PCAM). A memory controller that operates on the PCAM can implement a combination of a hash-based search technique and a sorted tree-based search technique to reduce lookup/addition/deletion latency in the PCAM. The memory controller can calculate a hash value of a received key to identify a memory sub-tree associated with the received key. The memory controller can, based on a sorted search (e.g., a binary search), then identify a position in the memory sub-tree at which a data entry comprising the key is stored, or in the case of a new data entry, the position in the memory sub-tree where the new data entry is to be inserted.

Such a combined approach for processing data entries of the PCAM can result in a deterministic lookup/addition/deletion latency. For example, for a PCAM that comprises 32 memory sub-trees, each comprising 32 data entries, the lookup latency is 6 clock cycles, i.e., 1 clock cycle to identify the memory sub-tree based on the hash value of a received key and 5 clock cycles (i.e., $\log_2(32)$) to identify a position of the data entry using binary search. In a CAM that comprises the same number of memory sub-trees and data entries, for a hash-based search technique using linear search, the latency is 33 clock cycles to identify the data entry and for a sorted tree-based search technique, the latency is 10 clock cycles to identify the data entry. Additionally, because of the deterministic latency associated with the memory operations (e.g., data entry lookup, retrieval, insertion, deletion, etc.) executed on the PCAM, other processing operations (e.g., operations of other processing components, digital logic, etc.) can be designed without incurring additional overhead (e.g., to meet maximum clock cycles, minimum bandwidth, available storage, etc.). Moreover, by implementing dynamic memory allocation in the PCAM, the memory controller can guard against lack of uniformity and the non-deterministic rate at which requests for executing operations on the PCAM are received, which can further improve efficiency of the PCAM.

FIG. 1 is an example conceptual diagram illustrating example operations for data entry access in a PCAM. FIG. 1 depicts a memory subsystem 100 comprising a memory controller 101 and a PCAM 108. The memory controller comprises a hash calculation unit 102, a binary search unit 104, and a memory management unit 106. The binary search unit 104 is coupled to the memory management unit 106 and to the hash calculation unit 102. The memory controller 101 performs various operations (e.g., read, write, addition, deletion, etc.) on the PCAM 108. As described above, the PCAM 108 is a realization of a content access memory (CAM, also referred to as content-addressable memory) using single port or dual port static random access memory (SRAM). Memory in the PCAM 108 is organized into memory sub-trees. In FIG. 1, the PCAM 108 comprises memory sub-tree 110 and memory sub-tree 112. The memory sub-trees represent a logical grouping of a subset of memory locations (or memory addresses). In other words, each memory sub-tree of the PCAM is associated with a predetermined number of memory locations. In FIG. 1, each of the memory sub-trees 110 and 112 comprises a group of 32 memory locations. In other words, the memory sub-trees 110 and 112 of the PCAM 108 can each store 32 data entries or 32 unique combinations of a key and the corresponding content. It is noted that the memory locations that constitute a memory sub-tree may or may not be contiguous. Furthermore, it is also noted that the SRAM memory that constitutes the PCAM 108 may be located on a single memory chip, on distinct memory chips, etc.

In one implementation, the memory controller 101 and the PCAM 108 may be implemented on an Ethernet bridge (e.g., a router, a switch, etc.). The Ethernet bridge may receive a packet to be routed to a destination address, via one of many ports of the Ethernet bridge. The Ethernet bridge may identify an appropriate port to which the packet is to be routed based on the destination address (e.g., a medium access control (MAC) address, an internet Protocol (IP) address, etc.) received in the packet. The memory controller 101 can use the destination address as the key to identify the corresponding content (e.g., a destination port). In another implementation, the memory controller 101 and the PCAM 108 may be implemented on a WLAN device. In one example, the WLAN device may receive a data stream to be processed. The WLAN device may process the data stream differently using a different set of processing parameters (e.g., encryption key) based on a stream identifier. The memory controller 101 can use the stream identifier as the key to identify the corresponding content (e.g., encryption key, processing parameters, etc.). Operations of the memory controller 101 for identifying the content corresponding to a key stored in the PCAM 108 are described in stages A-C.

At block A, the hash calculation unit 102 calculates a hash value of a received key 120 and identifies a sub-tree associated with the key 120. As described above, the PCAM 108 is divided into multiple memory sub-trees and each memory sub-tree comprises a predetermined number of memory locations. Each memory sub-tree can be identified by a unique identifier, in this case, a representation of the hash value of the key 120. The hash calculation unit 102 calculates an N-bit hash value of the key 120 and uses the calculated hash value to identify the sub-tree associated with the key 120. The hash calculation unit 102 can determine the value of N based on the number of memory sub-trees in the PCAM 108. For example, a PCAM with 1024 memory locations may be divided into 32 memory sub-trees, where each memory sub-tree comprises 32 memory locations. Accordingly, based on knowledge that the PCAM 108 comprises 32 memory sub-trees, the hash calculation unit 102 may calculate a 5-bit hash (e.g., $2^5=32$) of the key 120. In one implementation, the 5-bit hash value of keys that are associated with the memory sub-tree 110 may all map to a common hash value associated with the memory sub-tree 110. In another implementation, the hash calculation unit 102 can calculate an N-bit hash value of the key 120, such that N>5. The hash calculation unit 102 can truncate the calculated hash value or can select a subset of bits of the calculated hash value. The hash calculation unit 102 can use the subset of bits of the calculated hash value to identify the memory sub-tree associated with the key 120. After the hash calculation unit 102 calculates the hash value of the key 120, the hash calculation unit 102 can compare the hash value of the key 120 against pre-calculated hash values associated with the memory sub-trees of the PCAM 108. In FIG. 1, the hash calculation unit 102 determines that the key 120 and content 122 corresponding to the key 120 is stored in the memory sub-tree 110. It is noted, however, that the number of bits of the hash value of the key that are used to identify the memory sub-tree associated with the key 120 can vary depending on the number of memory sub-trees into which the PCAM 108 is divided.

At stage B, the binary search unit 104 determines a position at which a data entry comprising the received key 120 is stored in the identified memory sub-tree 110. Each memory sub-tree (e.g., the memory sub-tree 110) is organized as a sorted binary tree. The binary search unit 104 can execute binary search operations to identify a position, in the memory sub-tree 110, of the data entry that comprises the key. The binary search unit 104 can identify a key at an intermediate position (e.g., a midpoint position) of the memory sub-tree 110 and can compare the key at the intermediate position with the received key 120. If the key at the intermediate position is equal to the received key 120, then the requisite data entry is found. If the key at the intermediate position is greater than the received key 120, the binary search unit 104 selects a top half of the memory sub-tree 110 for further searching. If the key at the intermediate position is less than the received key 120, the binary search unit 104 selects a bottom half of the memory sub-tree 110 for further searching. Operations for further searching are performed as described above (e.g., determining a key at an intermediate position of the top/bottom half and comparing the determined key with the received key). For example, the memory sub-tree 110 may comprise keys with values 1-32 and the received key 120 may have a value of 10. The binary search unit 104 can determine that the key at the intermediate position has a value of 16. The binary search unit 104 can compare the key at the intermediate position (key value 16) with the received key (key value 10), determine that the key at the intermediate position is greater than the received key, and accordingly select a top half of the memory sub-tree 110. The top half of the memory sub-tree comprises keys with values 1-15. The binary search unit 104 can continue executing the binary search operations until the received key is identified in the memory sub-tree. In executing the binary search operations, the binary search unit 104 can reduce the number of data entries to be searched by a factor of two at each iteration and can identify the position of content associated with the key 120 in logarithmic time. In FIG. 1, the binary search unit 104 determines that the data entry 114 comprises the received key 120 and the corresponding content 122.

At stage C, the memory management unit 106 retrieves the content 122 that corresponds to the key 120. On identifying the position of the data entry that comprises the received key 120, the binary search unit 104 can communicate the position of the data entry in the identified sub-tree 110 to the memory management unit 106. For example, the binary search unit 104 may indicate a memory address associated with the data entry 114 that comprises the key 120 and the corresponding content 122. The memory management unit 106 can retrieve the content 122 from the memory address and can provide the content 122 to subsequent processing components. In the Ethernet bridge example described above, the memory management unit 106 can retrieve a destination port number (i.e., the content) associated with the MAC address (i.e., the key) to enable the Ethernet bridge to route the packet. It is noted that in some implementations, the binary search unit 104 may be unable to identify the data entry that comprises the key 120 and the corresponding content 122 in the memory sub-tree 110, or may determine that the data entry that comprises the key 120 and the corresponding content 122 does not exist in the memory sub-tree 110. Accordingly, the memory management unit 106 can provide a notification indicating that the data entry that comprises the key 120 does not exist.

Although FIG. 1 depicts static allocation of a predetermined number of memory locations to the memory sub-trees that constitute the PCAM 108, embodiments are not so limited. In some embodiments, the memory controller 101 can implement dynamic memory allocation to improve performance of the PCAM 108 and to further reduce latency associated with data entry retrieval, insertion, or deletion. As will be described with reference to FIG. 2 and FIG. 3, a fraction of the memory locations of the PCAM 108 can be allocated (in a static manner) to the memory sub-trees. The remaining memory locations of the PCAM 108 can be maintained in a free list. The memory locations in the free list can be dynamically allocated to, and can be de-allocated from, the memory sub-tree as required.

Figure 2:
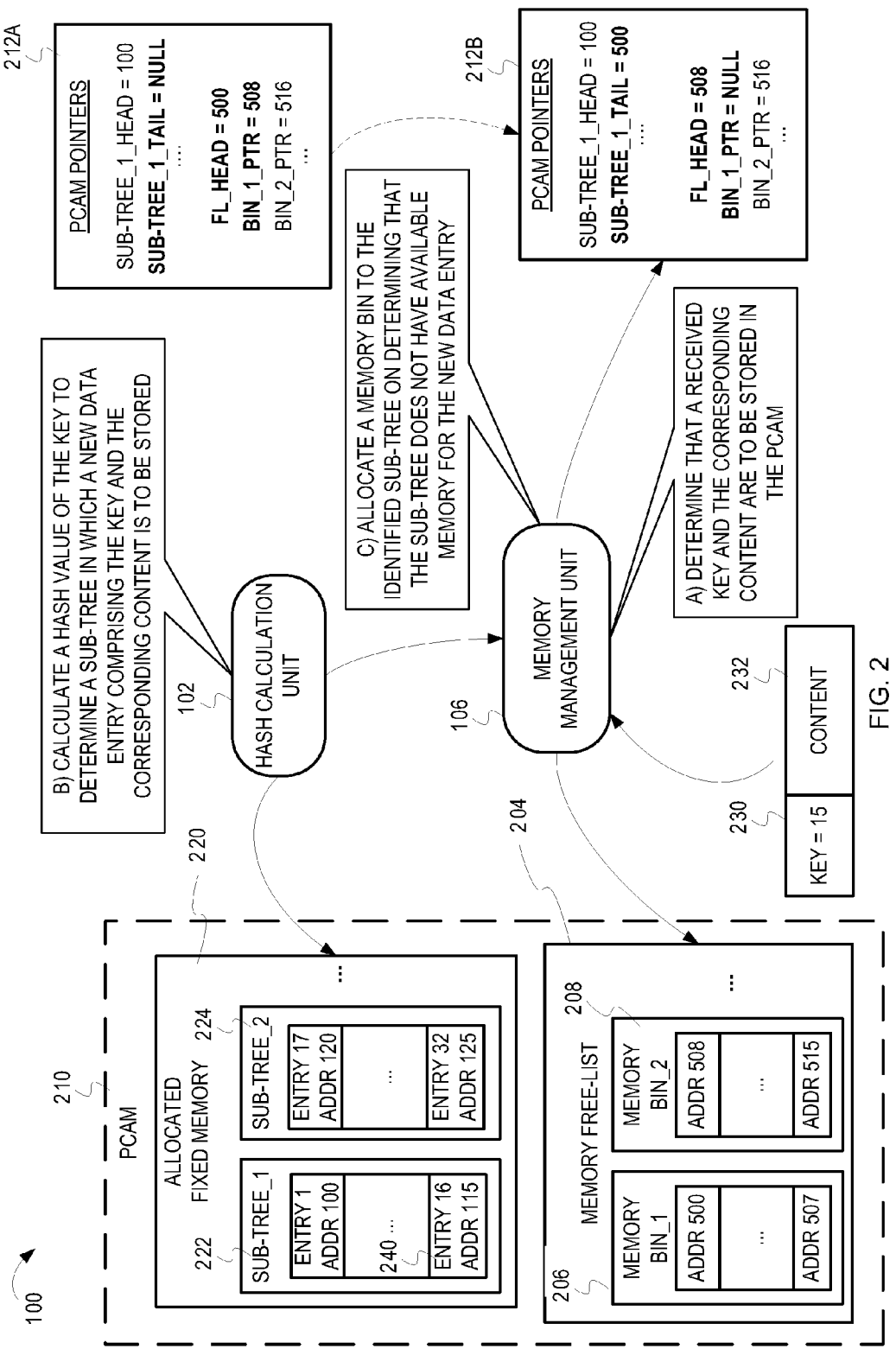
FIG. 2 depicts an example conceptual diagram illustrating example operations for dynamic memory allocation in a PCAM.
Figure 3:
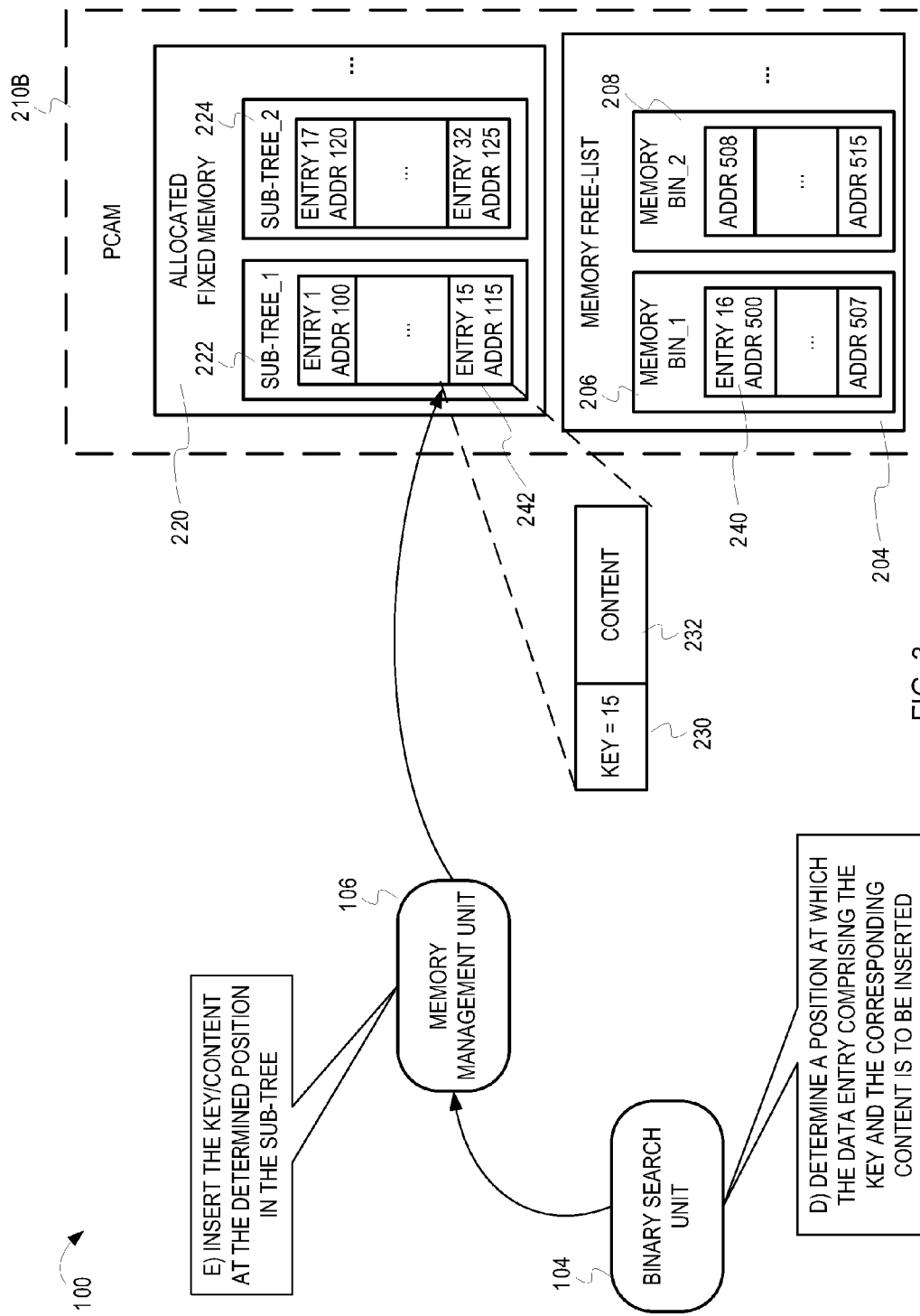
FIG. 3 is a continuation of FIG. 2 and depicts the example conceptual diagram illustrating example operations for inserting a data entry in the PCAM after dynamic memory allocation.

FIG. 2 and FIG. 3 depict an example conceptual diagram illustrating example operations for dynamic memory allocation in a PCAM. FIG. 2 depicts components of the memory controller 101 of FIG. 1 including the hash calculation unit 102, the binary search unit 104 (depicted in FIG. 3), and the memory management unit 106. The memory controller 101 performs various operations on a PCAM 210. The PCAM 210 comprises allocated fixed memory 220 and a memory free list 204. The allocated fixed memory 220 is allocated across multiple memory sub-trees 222 and 224. The memory sub-trees 222 and 224 comprise a fixed number of memory locations within which data entries (comprising a key and content associated with the key) can be stored. In FIG. 2, the memory sub-trees 222 and 224 each comprise 16 memory locations. In other words, the memory sub-trees 222 and 224 can each store 16 data entries or 16 unique combinations of a key and the corresponding content. Additional available memory of the PCAM 210 (e.g., memory that does not constitute the allocated fixed memory 220) is allocated to the memory free list 204. In the memory free list 204, memory locations are grouped into memory bins 206 and 208. Each memory bin 206 and 208 comprises a group of contiguous unallocated memory locations. In FIG. 2, each of the memory bins 206 and 208 comprise eight unallocated memory locations of the PCAM 210. In some embodiments, the memory controller 101 can dynamically allocate memory bins from the memory free list 204 to a memory sub-tree when additional memory is needed to store a data entry, and can de-allocate previously allocated memory bins from the memory sub-tree when empty. Operations for dynamically allocating/deallocating memory bins from the memory free list 204 to one or more memory sub-trees is further described in stages A-C of FIG. 2 and stages D-E of FIG. 3.

At stage A, the memory management unit 106 determines that a received key 230 and the corresponding content 232 are to be stored in the PCAM 210. The memory management unit 106 may receive the key 230 and the corresponding content 232 along with a request indicating the key 230 and the corresponding content 232 are to be stored in the PCAM 210. The memory management unit 106 may provide the key 230 to the hash calculation unit 102. The memory management unit 106 may cause the hash calculation unit 102, in conjunction with the binary search unit 104, to determine where (in the PCAM 210) the key 230 and the corresponding content 232 are to be stored.

At stage B, the hash calculation unit 102 calculates a hash value of the key 230 to determine a memory sub-tree in which a new data entry comprising the key 230 and the corresponding content 232 is to be stored. As described above, in one embodiment, the hash calculation unit 102 can calculate an N-bit hash value of the key 230 and can compare the hash value of the key 230 against pre-determined hash values associated with each of the memory sub-trees to identify the memory sub-tree associated with the key 230. In another embodiment, the hash calculation unit 102 can select a subset of bits of the hash value of the key 230 and can identify the memory sub-tree associated with the key 230 based on the selected subset of bits. In FIG. 2, the hash calculation unit 102 determines that a data entry comprising the key 230 and the corresponding content 232 is to be stored in the memory sub-tree 222.

At stage C, the memory management unit 106 allocates a memory bin from the memory free list 204 to the memory sub-tree 222 on determining that the memory sub-tree does not have available memory for the new data entry. As described above, the memory free list 204 is a data structure that represents one or more memory bins—each of which comprises a group of unallocated contiguous memory locations. In one implementation, four memory locations may be grouped together to form a memory bin of the memory free list 204. In another implementation, eight memory locations may be grouped together to form a memory bin of the memory free list 204. In another implementation, any suitable number of memory locations may be grouped together to form a memory bin of the memory free list 204.

The memory management unit 106 also maintains and keeps track of PCAM pointers 212A. The PCAM pointers indicate available memory bins in the free list and whether/which memory bins are allocated to the memory sub-trees. The PCAM pointers 212A represent an initial state of the PCAM 210. As depicted, each memory sub-tree is associated with a head pointer that references a first memory location of the memory sub-tree and a tail pointer that references a memory bin allocated to the memory sub-tree (if any). The head pointer for the memory sub-tree 222 (i.e., sub-tree_1_head) comprises a value of 100 which is the address of the first memory location of the memory sub-tree 222. The tail pointer for the memory sub-tree 222 (i.e., sub-tree_1_tail) comprises a NULL value to indicate that no memory bins are allocated to the memory sub-tree 222. Additionally, the PCAM pointers 212A also identify the memory free list 204 and the unallocated memory bins 206 and 208. The PCAM pointers 212A also comprise a free list head pointer (i.e., FL_head). The free list head pointer stores an address of the first memory location of a first memory bin of the free list. In FIG. 2, the free list head pointer comprises a value of 500, which is the address of the first memory location of the memory bin 206. A pointer associated with the memory bin 206 (i.e., bin_1_ptr) references a next memory bin 208 of the memory free list 204. In other words, bin_1_ptr stores a value of 508, which is the address of the first memory location of the memory bin 208. Likewise, a pointer associated with the memory bin 208 (i.e., bin_2_ptr) references a next memory bin (not shown) of the free list 204 by storing a value of 516 (e.g., an address of a first memory location of the next memory bin).

At stage C in FIG. 2, the memory management unit 106 allocates the memory bin 206 from the memory free list 204 to the memory sub-tree 222. Additionally, the memory management unit 106 also updates the PCAM pointers 212A. The updated PCAM pointers 212B represent the state of the PCAM 210 after the memory bin 206 is allocated to the memory sub-tree 222. The differences between a current state of the PCAM pointers 212B and a previous state of the PCAM pointers 212A are indicated in bold font. As depicted by the PCAM pointers 212B, the memory management unit 106 updates the tail pointer of the memory sub-tree 222 (i.e., sub-tree_1_tail) to reference the memory bin 206 allocated to the memory sub-tree 222. The pointer sub-tree_1_tail now stores a value of 500, which is the address of the first memory location of the memory bin 206 allocated to the memory sub-tree 222. The memory management unit 106 also updates the free list head pointer (FL_head) to reference the next memory bin 208 of the free list 204. The pointer FL_head now stores a value of 508, which is the address of the first memory location of the memory bin 208. The memory management unit 106 updates the pointer associated with the memory bin 206 (i.e., bin_1_ptr) to store a NULL value, indicating that only the memory bin 206 has been allocated to the memory sub-tree 222. It is noted that if the memory bin 208 is subsequently allocated to the memory sub-tree 222, FL_Head would be updated to reference a next unallocated memory bin of the memory free list 204 and bin_1_ptr would be updated to reference the memory bin 208 allocated to the memory sub-tree 222. Also, bin_2_ptr would be updated to store a NULL value to indicate that two memory bins 206 and 208 are allocated to the memory sub-tree 222.

At stage D in FIG. 3, the binary search unit 104 determines a position in the memory sub-tree 222 at which the data entry comprising the key 230 and the corresponding content 232 is to be inserted in the memory sub-tree 222. The binary search unit 104 can determine a number of data entries associated with the memory sub-tree 222. In one implementation, the binary search unit 104 can access a pre-determined memory location that is used to keep track of the number of data entries associated with the memory sub-tree 222. In this implementation, the binary search unit 104 can keep track of the number of data entries associated with each memory sub-tree of the PCAM 210. In another implementation, the binary search unit 104 can calculate the number of data entries associated with the memory sub-tree 222 when required. The binary search unit 104 can determine whether the memory sub-tree 222 has overflowed (e.g., by checking status of an overflow flag), determine a number of memory bins that have been allocated to the memory sub-tree 222, etc. Based on the number of memory bins allocated to the memory sub-tree 222 and a number of data entries in a last allocated memory bin, the binary search unit 104 can determine the number of data entries associated with the memory sub-tree 222. For example, the binary search unit 104 may determine that the memory sub-tree 222 (with a fixed size of 16 memory locations) has overflowed. The binary search unit 104 may also determine that two memory bins (each with a size of 4 memory locations) were allocated to the memory sub-tree 222 and that only one data entry was inserted into the last allocated memory bin. Accordingly, the binary search unit 104 can determine that 16+4+1=21 data entries are associated with the memory sub-tree 222. Based on the number of data entries associated with the memory sub-tree 222, the binary search calculation unit 104 can execute binary search operations, described with reference to FIG. 1 (stage B), to determine the position at which the data entry comprising the key 230 and the corresponding content 232 is to be inserted. In FIG. 3, the binary search unit 104 determines that the key 230 with value 15 is to be inserted at memory address 115 to precede the data entry 240 of FIG. 2 (with key value 16). The binary search unit 104 can indicate, to the memory management unit 106, that the data entry comprising the key 230 and the corresponding content 232 is to be inserted at memory address 115.

At stage E, the memory management unit 106 inserts a data entry 242 comprising the key 230 and the corresponding content 232 at the determined position (e.g., at the address 115) in the memory sub-tree 222. The memory management unit 106 can shift other data entries of the memory sub-tree 222 to insert the data entry 242 in the appropriate location (e.g., at the memory address 115). As depicted in the PCAM 210B, the data entry 240 is shifted to a next memory location (i.e., the address 500 of the memory bin 206 allocated to the memory sub-tree 222) so that the data entry 242 can be inserted to precede the data entry 240.

Although not depicted in FIGS. 2-3, the memory controller 101 can perform operations also described with reference to FIG. 1 for retrieving content corresponding to a received key. Furthermore, the memory controller 101 can also execute operations to delete a data entry comprising the received key as will further be described with reference to FIGS. 6-7.

Figure 4:
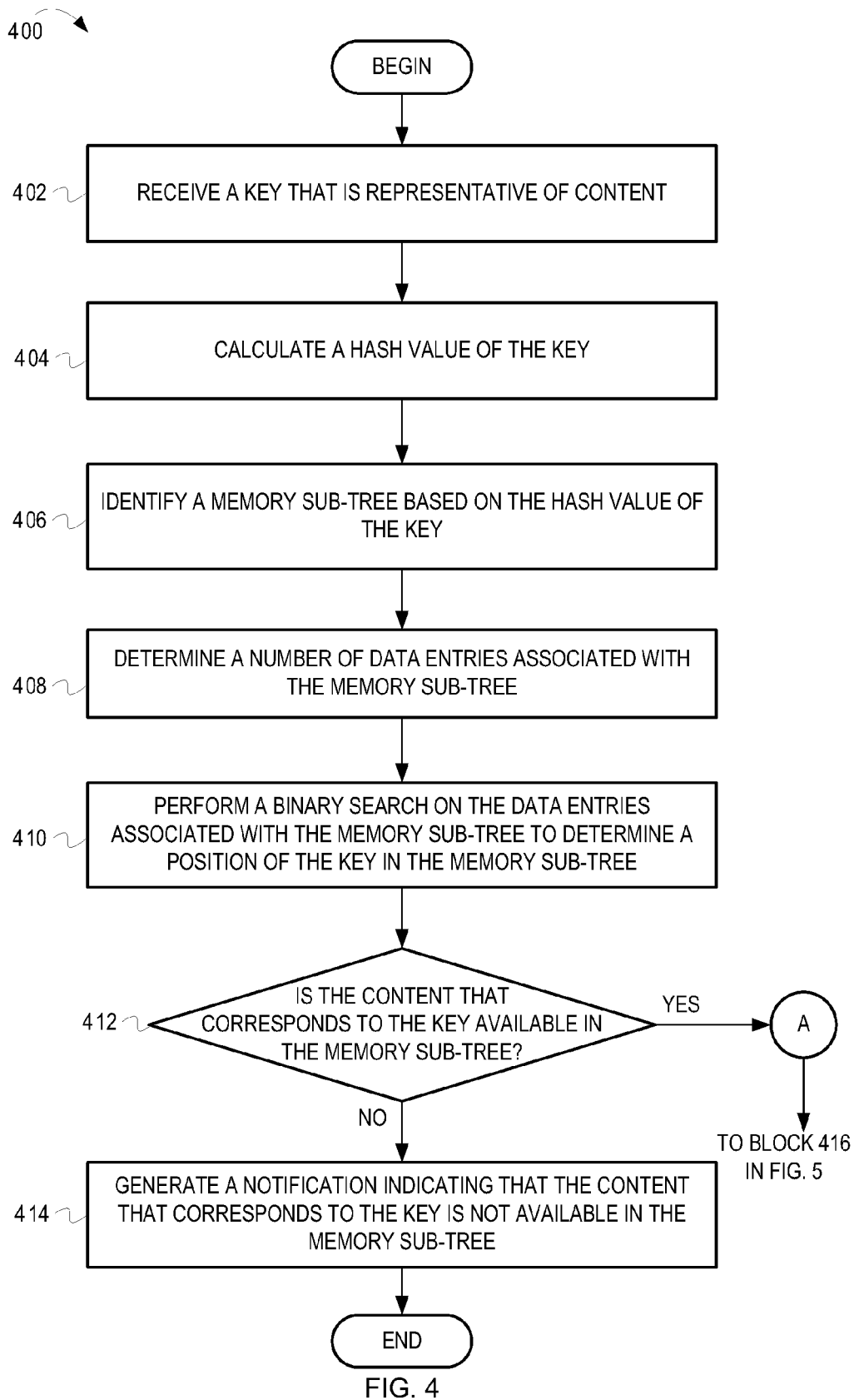
FIG. 4 and FIG. 5 depict a flow diagram illustrating example operations for identifying a data entry in a PCAM.
Figure 5:
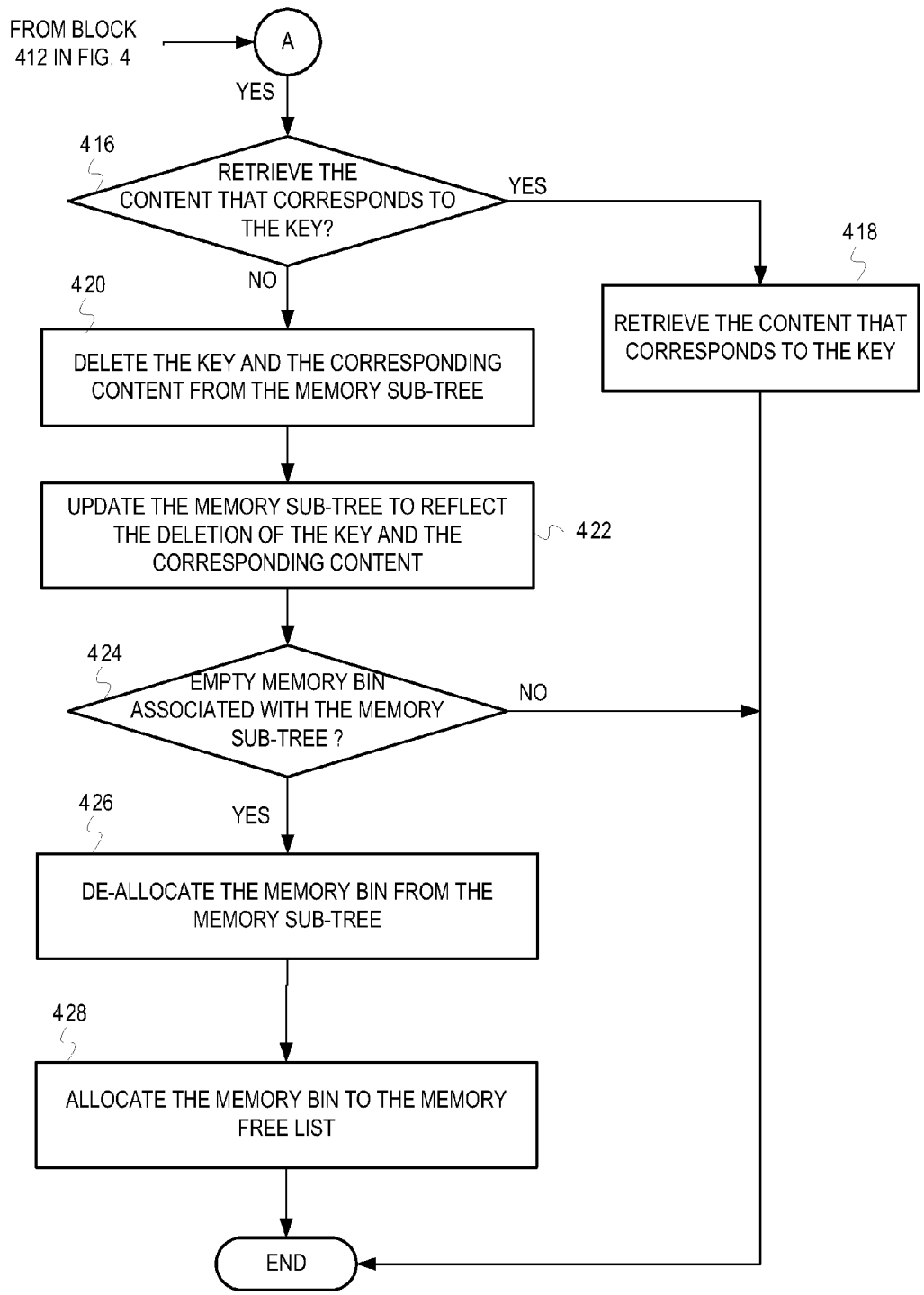

FIG. 4 and FIG. 5 depict a flow diagram ("flow") 400 illustrating example operations for identifying a data entry in a PCAM. The flow 400 begins at block 402 in FIG. 4.

At block 402, a key that is representative of content is received. For example, a memory management unit 106 of FIG. 1 can receive the key. The key may be received in a packet (e.g., from a transmitting network device), as part of a request to access/modify content (e.g., from another processing component), etc. Additionally, the memory management unit 106 may also receive an indication that determines whether content that corresponds to the key is to be accessed or deleted from the PCAM. The flow continues at block 404.

At block 404, a hash value of the key is calculated. For example, the hash calculation unit 102 of FIG. 1 can calculate the hash value of the key. The hash calculation unit 102 can use any suitable algorithm (e.g., SHA, MD5, etc.) to calculate the hash value of the key. The hash calculation unit 102 can calculate an N-bit hash value of the key. The hash calculation unit 102 may determine the value of N based on a number of memory sub-trees into which a PCAM is divided. For example, a PCAM with 2048 memory locations may be equally allocated across 64 memory sub-trees, where each sub-tree comprises 32 memory locations. Accordingly, the hash calculation unit 102 may calculate a 6-bit (e.g., $2^6$=64) hash value of the key. In some implementations, the hash calculation unit 102 may calculated the hash value of the key and may select a subset of bits of the calculated hash value of the key. For example, the hash calculation unit 102 may calculate a 10-bit hash value of the key and may select 6 most significant bits of the calculated hash value of the key. The flow continues at block 406.

At block 406, a memory sub-tree is identified based on the hash value of the key. For example, the hash calculation unit 102 can identify the memory sub-tree based on the hash value of the key, as was described above with reference to FIG. 1. The hash value of the key enables the hash calculation unit 102 to identify a memory sub-tree that contains a data entry comprising the key. In one implementation, each memory sub-tree may be associated with a pre-calculated hash value. Hash values of the keys that are associated with a particular memory sub-tree may map to the pre-calculated hash value associated with the particular memory sub-tree. For example, a first memory sub-tree may be associated with the pre-calculated 5-bit hash value of A123F. The first memory sub-tree may comprise 32 keys and their corresponding content. The 5-bit hash values of the 32 keys associated with the first memory sub-tree may all map to the hash value A123F. The hash calculation unit 102 can compare the hash value of the key (received at block 402) against the pre-calculated hash values associated with each of the memory sub-trees of the PCAM 108 to identify the memory sub-tree associated with the key. The flow continues at block 408.

At block 408, a number of data entries associated with the memory sub-tree is determined. For example, the binary search unit 104 determines the number of data entries associated with the memory sub-tree, as was described above with reference to FIG. 1. Each memory sub-tree may be associated with a variable that indicates the number of data entries stored in the memory sub-tree. In some implementations, one or more additional memory bins from a memory free list 204 of FIG. 2 may be allocated to the memory sub-tree. In such a scenario, the number of data entries in the one or more additional memory bins allocated to the memory sub-tree may also be taken into consideration while determining the number of data entries associated with the memory sub-tree. For example, the memory sub-tree may comprise 16 data entries. After the memory sub-tree overflows, a memory bin (comprising four available memory locations) may be allocated to the memory sub-tree. It may be determined that the memory bin comprises only two data entries. Accordingly, it may be determined that 18 data entries are associated with the memory sub-tree. The flow continues at block 410.

At block 410, a binary search is performed on the data entries associated with the memory sub-tree to determine a position of the key in the memory sub-tree. For example, the binary search unit 104 can execute binary search operations on the data entries associated with the memory sub-tree to determine the position of a data entry that comprises the key in the memory sub-tree, as was described above with reference to FIG. 1. The binary search operations can involve A) identifying a key that corresponds to an intermediate data entry of the memory sub-tree, B) comparing the identified key with the received key, and C) further performing operations A and B on a top half or a bottom half of the data entries associated with the memory sub-tree depending on whether the received key is less than or greater than the identified key. The intermediate data entry can be determined based on knowledge of the total number of data entries associated with the memory sub-tree. The flow continues at block 412.

At block 412, it is determined whether the content that corresponds to the key is available in the memory sub-tree. For example, the memory management unit 106 can determine whether the content that corresponds to the key is available in the memory sub-tree. For example, the binary search unit 104 may determine that a data entry comprising a received key cannot be found in the memory sub-tree identified by the hash calculation unit 102. Accordingly, the binary search unit 104 may communicate the inability to identify the data entry to the memory management unit 106. As another example, the binary search unit 104 may identify a data entry comprising the received key. The binary search unit 104 may communicate a memory address of the identified data entry to the memory management unit 106. If it is determined that the content that corresponds to the key is available in the memory sub-tree, the flow continues at block 416 in FIG. 5. Otherwise, the flow continues at block 414.

At block 414, a notification indicating that the content that corresponds to the received key is not available in the memory sub-tree is generated. For example, the memory management unit 106 can send a notification (e.g., to a processing unit that requested the content) indicating that the content that corresponds to the received key cannot be identified. From block 414, the flow ends.

At block 416 in FIG. 5, it is determined whether the content that corresponds to the key is to be retrieved. The flow 400 moves from block 412 in FIG. 4 to block 416 in FIG. 5 if it is determined that the content that corresponds to the key is available in the memory sub-tree. For example, the memory management unit 106 can determine whether to retrieve the content that corresponds to the key. The memory management unit 106 can determine, based on a received request/packet that comprises the key, whether the content that corresponds to the key is to be retrieved or deleted from the memory sub-tree. If it is determined that the content that corresponds to the key is to be retrieved, the flow continues at block 418. Otherwise, the flow continues at block 420.

At block 418, the content that corresponds to the key is retrieved. For example, the memory management unit 106 retrieves the content that corresponds to the key. For example, the received key may be a MAC address (or an IP address) of a destination network device. The memory controller 101 implemented on an Ethernet bridge may identify a destination port (i.e., content) corresponding to the received MAC address and may route the received packet via the identified destination port. As another example, the received key may be a stream identifier of a data stream. The memory controller 101 implemented on a WLAN device may identify an encryption key (i.e., content) based on the stream identifier and may accordingly encrypt/decrypt the data stream. It is noted, however, that the memory controller 101 and the PCAM 108 can be implemented in various other applications and devices. From block 418, the flow ends.

At block 420, it is determined that the key and the corresponding content are to be deleted from the memory sub-tree. The flow 400 moves from block 416 to block 420 on determining that the content that corresponds to the key is available in the memory sub-tree and are to be deleted from the memory sub-tree. For example, the memory management unit 106 can delete the key and the corresponding content from the memory sub-tree. The flow continues at block 422.

At block 422, the memory sub-tree is updated to reflect the deletion of the key and the corresponding content. For example, the memory management unit 106 updates the memory sub-tree to reflect deletion of the key and the corresponding content. The memory management unit 106 can shift other data entries of the memory sub-tree so that there are no discontinuities between consecutive data entries of the memory sub-tree. For example, a memory sub-tree may comprise data entries 10-20. After a data entry 15 is deleted, the memory management unit 106 may shift data entries 16-20 by one memory location so that data entry 14 is followed by data entry 16. The flow continues at block 424.

At block 424, it is determined whether an empty memory bin is associated with the memory sub-tree. For example, the memory management unit 106 can determine whether an empty memory bin is associated with the memory sub-tree. As described above, a memory bin from the memory free list 204 of FIG. 2 may be allocated to the memory sub-tree if the memory sub-tree overflows and if the memory sub-tree does not comprise additional memory locations to store new data entries. In determining whether an empty memory bin is associated with the memory sub-tree, the memory management unit 106 can determine whether all the data entries of the memory bin have been deleted. If the memory bin previously allocated to the memory sub-tree is empty, the memory management unit 106 can reallocate the memory bin to the memory free list 204 for future allocation to other overflowing memory sub-trees. If it is determined that an empty memory bin is associated with the memory sub-tree, the flow continues at block 426. Otherwise, the flow ends.

At block 426, the empty memory bin is de-allocated from the memory sub-tree. For example, the memory management unit can 106 de-allocate the empty memory bin from the memory sub-tree. To de-allocate the empty memory bin from the memory sub-tree, the memory management unit 106 can update a pointer associated with the memory sub-tree. For example, with reference to the PCAM pointers 212B of FIG. 2, the tail pointer associated with the memory sub-tree 222 (e.g., sub-tree_1_tail) references the memory bin 206 allocated to the memory sub-tree 222 (e.g., by storing an address of 500 of the memory bin 206). After the memory bin 206 is de-allocated from the memory sub-tree 222, the memory management unit 106 can update the tail pointer associated with the memory sub-tree 222 to a NULL value (as depicted in the PCAM pointers 212A) to indicate that no memory bins are allocated to the memory sub-tree 222. As another example, the tail pointer associated with the memory sub-tree may reference the memory bin 206 which, in turn, may reference a second memory bin 208 allocated to the memory sub-tree 222. The memory management unit 106 may determine that the second memory bin 208 is empty and may de-allocate the second memory bin 208 from the memory sub-tree 222. Accordingly, a pointer associated with the first memory bin 206 may be update to remove the reference to the second memory bin 208. The flow continues at block 428.

At block 428, the memory bin is allocated to the memory free list. For example, the memory management unit 106 can allocate the memory bin to the memory free list 204. The memory management unit 106 can update the free list head pointer and/or other memory bin pointers to indicate re-allocation of the memory bin to the free list. For example, with reference to the PCAM pointers 212B of FIG. 2, the head pointer associated with the free list (FL_Head) references the memory bin 208 (e.g., by storing an address of 508 of the memory bin 208). After the memory bin 206 is reallocated to the free list 204, the memory management unit 106 updates the free list head pointer to reference the memory bin 206. The memory management unit 106 also updates the pointer associated with the memory bin 206 (i.e., bin_1_ptr) to reference the memory bin 208. From block 428, the flow ends.

Figure 6:
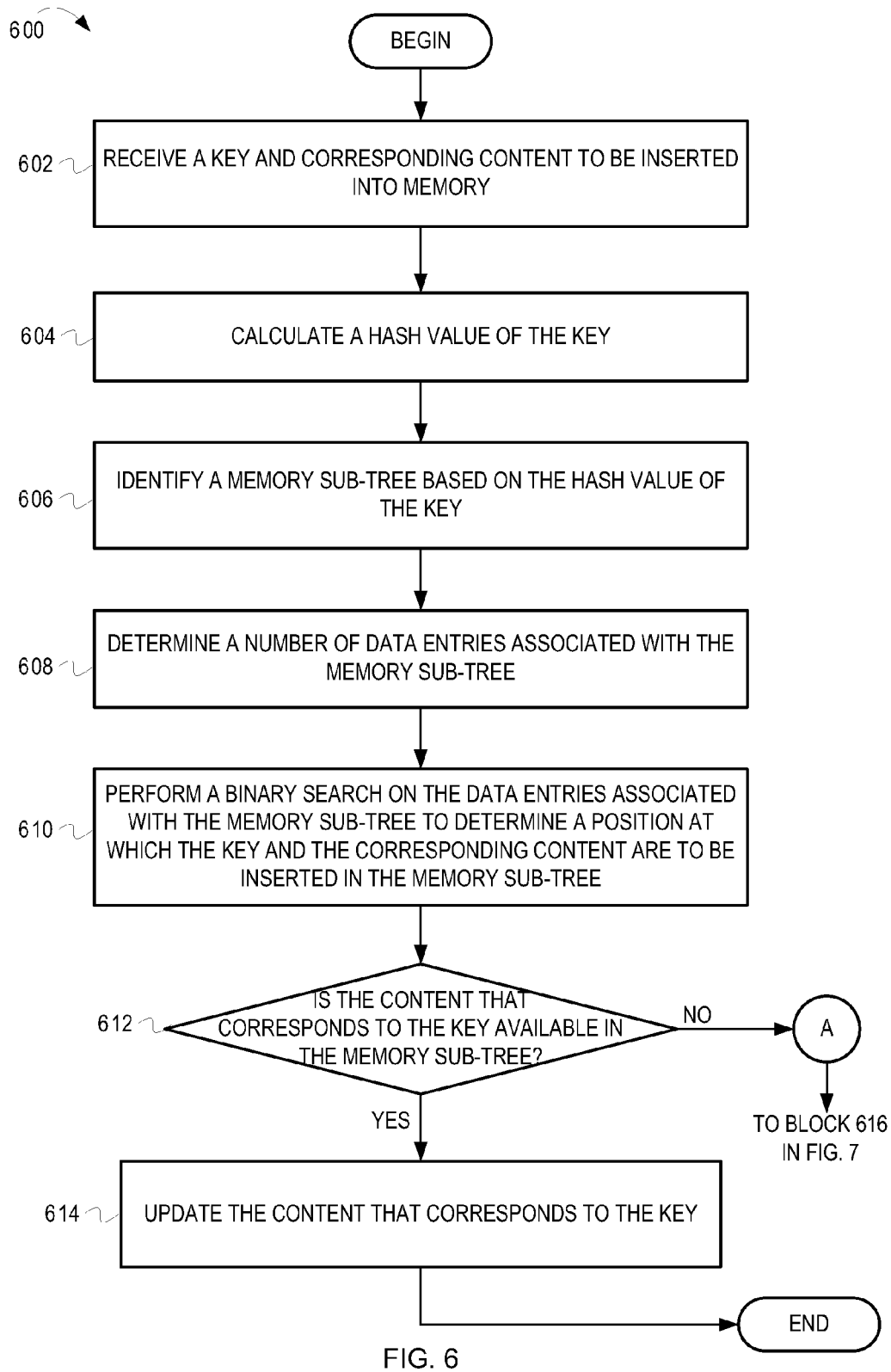
FIG. 6 and FIG. 7 depict a flow diagram illustrating example operations for inserting a data entry in a PCAM.
Figure 7:
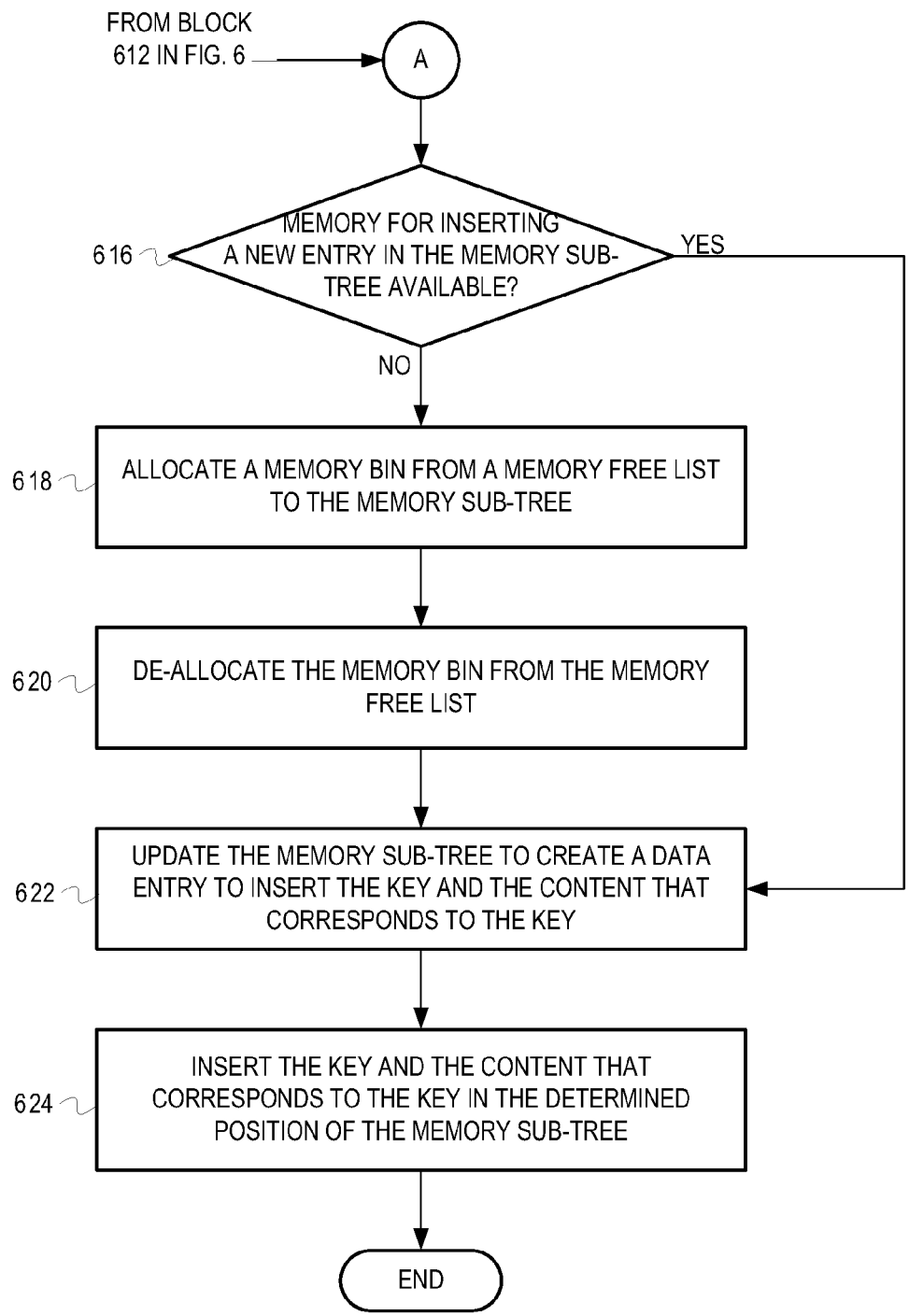

FIG. 6 and FIG. 7 depict a flow diagram 600 illustrating example operations for inserting a data entry in a PCAM. The flow 600 begins at block 602 in FIG. 6.

At block 602, a key and corresponding content to be inserted into a memory unit are received. For example, a memory management unit 106 of FIG. 2 can receive the key 230 and the corresponding content 232. The memory management unit 106 may also receive an indication that the key 230 and the corresponding content 232 are to be inserted into the PCAM 210 of FIG. 2. The flow continues at block 604.

At block 604, a hash value of the key is calculated. The memory management unit 106 can provide the key to a hash calculation unit 102 of FIG. 2. The hash calculation unit 102 can calculate the hash value of the key as described above with reference to FIG. 1 and FIG. 4 (block 404). The flow continues at block 606.

At block 606, a memory sub-tree is identified based on the hash value of the key. For example, the hash calculation unit 102 can identify, based on the hash value of the key, the memory sub-tree of the PCAM 220 with which the key 230 and the corresponding content 232 are to be associated. In other words, the hash calculation unit 102 can identify the memory sub-tree within which a data entry comprising the key 230 and the corresponding content 232 is to be inserted. The hash calculation unit 102 can identify the memory sub-tree in accordance with operations described in FIG. 1 and FIG. 4 (block 406). The flow continues at block 608.

At block 608, a number of data entries associated with the memory sub-tree is determined. For example, the binary search unit 104 can determine the number of data entries associated with the memory sub-tree as described with reference to FIG. 3 and block 408 of FIG. 4. The flow continues at block 610.

At block 610, a binary search is performed on the data entries associated with the memory sub-tree to determine a position in the memory sub-tree at which the key and the corresponding content are to be inserted. For example, the binary search unit 104 can execute binary search operations (as described in FIGS. 1 and 4) on the data entries associated with the memory sub-tree to determine the position at which the data entry comprising the key 230 and the corresponding content 232 is to be inserted. The flow continues at block 612.

At block 612, it is determined whether the content that corresponds to the key is available in the memory sub-tree. In one implementation, the memory management unit 106 can determine whether the content that corresponds to the key is available in the memory sub-tree. In another implementation, the binary search unit 104 may determine and communicate to the memory management unit 106 that a data entry comprising the key (received at block 602) was identified in the memory sub-tree. Alternately, the binary search unit 104 may communicate, to the memory management unit 106, a memory address in the memory sub-tree at which the data entry comprising the key 230 and the corresponding content 232 is to be inserted. If it is determined that the content that corresponds to the key is not available in the memory sub-tree, the flow continues at block 616 in FIG. 7. Otherwise, the flow continues at block 614.

At block 614, the content that corresponds to the key is updated. For example, the memory management unit 106 can update the content that corresponds to the key. The memory management unit 106 can overwrite (or delete) old content that corresponds to the key and can replace the old content with new content (received at block 602). From block 614, the flow ends.

At block 616 in FIG. 7, it is determined whether memory for inserting a new data entry in the memory sub-tree is available. The flow 600 moves from block 612 in FIG. 6 to block 616 in FIG. 7 if it is determined that a data entry that corresponds to the received key cannot be found in the memory sub-tree. A memory management unit 106 of FIG. 2 can determine whether memory for inserting the new data entry in the memory sub-tree is available. The memory management unit 106 can determine whether a maximum number of data entries have been inserted into the memory sub-tree, whether the memory sub-tree has overflowed, whether additional memory bins were previously allocated to the memory sub-tree, whether the additional memory bins have overflowed, etc. If it is it is determined whether memory for inserting the new data entry in the memory sub-tree is available, the flow continues at block 622. Otherwise, the flow continues at block 618.

At block 618, a memory bin is allocated from a memory free list to the memory sub-tree. For example, the memory management unit 106 can allocate the memory bin 206 from the memory free list 204 to the memory sub-tree 222. As described above, the memory bin comprises multiple contiguous memory locations (e.g., a group of four memory locations, a group of eight memory locations, etc.) that can be dynamically allocated to memory sub-trees. To allocate the memory bin 206 to the memory sub-tree 222, the memory management unit 106 can indicate (e.g., by setting an overflow flag associated with the memory sub-tree) that the memory sub-tree has overflowed. The memory management unit 106 can update a pointer associated with the memory sub-tree to reference the memory bin 206 allocated to the memory sub-tree 222. If the memory management unit 106 determines that a previously allocated memory bin has overflowed, the memory management unit 106 can first indicate that the previously allocated memory bin has overflowed. Next, the memory management unit 106 can update a pointer associated with the previously allocated memory bin to reference a new memory bin allocated to the memory sub-tree. The flow continues at block 620.

At block 620, the memory bin is de-allocated from the memory free list. For example, the memory management unit 106 can de-allocate the memory bin 206 from the memory free list 204. The memory management unit 106 can update pointers associated with the memory free list and pointers associated with the memory bins to indicate that the memory bin 206 is no longer part of the memory free list 204 (and is, therefore, not available for allocation to other memory sub-trees). With reference to the PCAM pointers 212B of FIG. 2, the memory management unit 106 can update the head pointer associated with the free list and the pointer associated with the memory bin 206 ((e.g., FL_Head and bin_1_ptr respectively) so that the head pointer associated with the memory free list 204 no longer references the memory bin 206. The flow continues at block 622.

At block 622, the memory sub-tree is updated to create a data entry to insert the key and the content that corresponds to the key. For example, the memory management unit 106 can update the memory sub-tree 222 to create a new data entry to insert the key and the content that corresponds to the key. The memory management unit 106 can shift one or more data entries so that the new data entry is inserted in an appropriate position (determined at block 610) in the memory sub-tree to maintain a sorted memory sub-tree, similarly as was described above with reference to block 422 of FIG. 4. The flow continues at block 624.

At block 624, the key and the content that corresponds to the key are inserted in the determined position of the memory sub-tree. For example, the memory management unit 106 can insert the key and the content that corresponds to the key in the determined position of the memory sub-tree. From block 624, the flow ends.

It should be understood that the depicted diagrams (FIGS. 1-7) are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-7 describe the hash calculation unit 102 computing a single hash value of a key to identify a memory sub-tree associated with the key, embodiments are not so limited. In some implementations, more than one hash values can be calculated per memory sub-tree. For example, on receiving a key, a first hash value (e.g., a 5-bit hash value) of the key can be calculated to identify the memory sub-tree associated with the key. Next, a second hash value of the key (e.g., a 3-bit hash value) may be calculated to determine a subset of the data entries in the memory sub-tree which may comprise the received key (or within which the data entry comprising the key is to be inserted). Depending on the number of data entries in the memory sub-tree, any suitable number of hash values can be calculated to identify, at each iteration, a smaller number of data entries which may comprise the received key.

In some embodiments, if the size of the PCAM is P (i.e., the PCAM can support P data entries) and if the hash calculation unit 102 is configured to calculate an N-bit hash value of the key, P/2 memory locations can be equally allocated across $2^N$ memory sub-trees. The remaining P/2 memory locations can be divided into memory bins and can be allocated to the memory free list 204. The P/2 memory locations in the memory bins can be dynamically allocated to the memory sub-trees when needed. This can reduce hardware complexity and latency of data retrieval, addition, and deletion. The addition/deletion latency can be calculated as $P/(2^N)$ and the data retrieval lookup latency is of the order of $\log(P/(2^N))$. However, it is understood that the PCAM need not be divided equally between the allocated fixed memory (i.e., memory allocated to the memory sub-trees) and the memory free-list.

It is noted that although FIG. 2 (at stage C) describes each memory sub-tree being associated with a head pointer and a tail pointer, embodiments are not so limited. In some implementations, the memory sub-trees may not be associated with a head pointer. Instead, an address of the first memory location of each memory sub-tree may be pre-determined and fixed. Only a single pointer may be associated with the memory sub-tree. If memory bins from the memory free list 204 are not allocated to the memory sub-tree 222, the pointer associated with the memory sub-tree 222 may store a NULL value. When a memory bin from the memory free list 204 is allocated to the memory sub-tree 222, the pointer associated with the memory sub-tree 222 may be updated to reference the memory bin allocated to the memory sub-tree 222.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
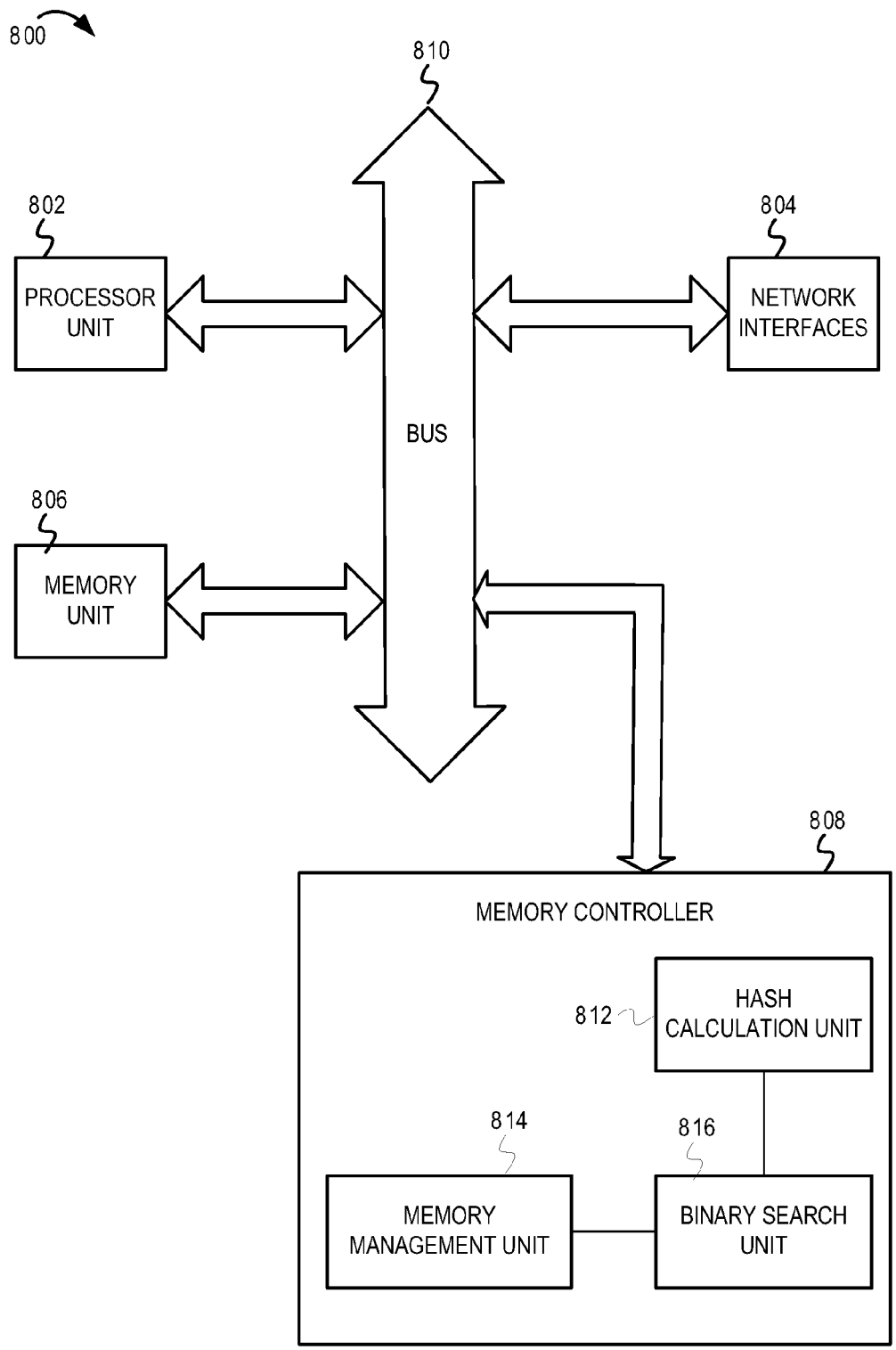
FIG. 8 is a block diagram of one embodiment of a computer system including a mechanism for processing data entries in a PCAM.

FIG. 8 is a block diagram of one embodiment of a computer system 800 including a mechanism for processing data entries in a PCAM. In some implementations, the computer system 800 may be one of a personal computer (PC), a laptop, a netbook, a mobile phone, a network router, a network switch, or other electronic systems comprising a memory controller. The computer system 800 includes a processor unit 802 (possibly including multiple processors, multiple cores, multiple nodes, and/or implementing multi-threading, etc.). The computer system 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 800 also includes a bus 810 (e.g., PCI, ISA, PCI-Express, HyperTransport®, InfiniBand®, NuBus, AHB, AXI, etc.), and network interfaces 804 that include at least one wireless network interface (e.g., a WLAN interface, a Bluetooth® interface, a WiMAX interface, a ZigBee® interface, a Wireless USB interface, etc.).

The computer system 800 also includes a memory controller 808. The memory controller 808 comprises a hash calculation unit 812, a memory management unit 814, and a binary search unit 816. The memory controller 808 executes operations described with reference to FIGS. 1-7 to access and process data entries of a PCAM, which can be implemented in the memory unit 806 (e.g., using SRAM). It is noted that any one or more of the components of the memory controller 808 can be implemented in hardware and/or software on a common chip or integrated circuit, on separate chips and then coupled together, etc.

Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802, the memory unit 806, and the network interfaces 806 are coupled to the bus 810. Although illustrated as being coupled to the bus 810, the memory unit 806 may be coupled to the processor unit 802.

While the embodiments are described with reference to various implementations and exploitations, it will be understood that these embodiments are illustrative and that the scope of the inventive subject matter is not limited to them. In general, techniques for implementing a pseudo content access memory as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for implementing a memory subsystem in a computer system, the method comprising:
   determining a first hash value of a first key received at a memory controller of the memory subsystem;
   identifying a first memory sub-tree associated with the first key based, at least in part, on the first hash value, wherein the first memory sub-tree is a logical group of a first plurality of memory locations of a memory of the memory subsystem;
   executing a binary search on the first memory sub-tree to identify a first memory location that comprises a key that matches the first key and first content that corresponds to the matching key;
   deleting the matching key and the first content from the first memory location of the first memory sub-tree;
   determining that a memory bin comprising a second plurality of memory locations previously allocated from a memory free list to the first memory sub-tree is empty after deleting the matching key and the first content; and
   deallocating the memory bin from the first memory sub-tree to the memory free list.

2. The method of claim 1, further comprising:
   determining a second hash value of a second key received at the memory controller;
   identifying a second memory sub-tree associated with the second key based, at least in part, on the second hash value;
   executing a binary search on the second memory sub-tree to identify a second memory location that matches the second key; and
   retrieving second content that corresponds to the second key from the second memory location for further processing.

3. The method of claim 1, further comprising:
   updating the first memory sub-tree to maintain a sorted first memory sub-tree after deleting the matching key and the first content.

4. The method of claim 1, further comprising:
   determining a second hash value of a second key received at the memory controller;
   identifying a second memory sub-tree associated with the second key based, at least in part, on the second hash value; and
   executing a binary search on the second memory sub-tree to identify a second memory location for storing the second key and second content that corresponds to the second key.

5. The method of claim 4, further comprising:
   receiving, at the memory controller of the memory subsystem, the second key, the second content that corresponds to the second key, and an indication that the second key and the second content should be stored in the memory.

6. The method of claim 1, wherein the memory is a pseudo content addressable memory (PCAM) that includes a plurality of memory sub-trees, wherein each of the plurality of memory sub-trees is associated with a plurality of memory locations of the memory, wherein each of the plurality of memory locations are organized as a sorted binary tree.

7. The method of claim 1, wherein deallocating the memory bin from the first memory sub-tree to the memory free list further comprises:
   updating a first pointer associated with the first memory sub-tree to indicate that the memory bin is deallocated from the first memory sub-tree; and
   updating a second pointer associated with the memory free list to indicate that the memory bin is reallocated to the memory free list.

8. The method of claim 1, further comprising:
   determining a second hash value of the first key after identifying the first memory sub-tree; and
   determining a subset of the first plurality of memory locations of the first memory sub-tree based, at least in part, on the second hash value,
   wherein executing the binary search on the first memory sub-tree comprises executing the binary search on the subset of the first plurality of memory locations to identify the first memory location.

9. A method for implementing a memory subsystem in a computer system, the method comprising:
   receiving, at a memory controller of the memory subsystem, a key, content that corresponds to the key, and an indication to store the key and the content in a memory of the memory subsystem;
   identifying a first memory sub-tree associated with the key based, at least in part, on a hash value of the key, wherein the first memory sub-tree is a logical group of a first plurality of memory locations of the memory of the memory subsystem;
   determining whether the first plurality of memory locations allocated for the first memory sub-tree comprises an empty memory location for storing the key and the content;
   in response to determining that the first plurality of memory locations does not comprise an empty memory location,
      dynamically allocating a memory bin comprising a second plurality of memory locations from a memory free list to the first memory sub-tree; and
      executing a binary search on the first plurality of memory locations and the memory bin allocated to the first memory sub-tree to identify a destination memory location for storing the key and the content.

10. The method of claim 9, wherein executing the binary search further comprises:
    determining a first quantity of data entries in the first memory sub-tree and a second quantity of data entries in the memory bin allocated to the first memory sub-tree.

11. The method of claim 9, further comprising:
    updating the first memory sub-tree to maintain a sorted first memory sub-tree after storing the key and corresponding content at the destination memory location.

12. The method of claim 9, wherein allocating the memory bin from the memory free list to the first memory sub-tree further comprises:
    updating a first pointer associated with the first memory sub-tree to indicate that the memory bin is allocated to the first memory sub-tree; and
    updating a second pointer associated with the memory free list to indicate that the memory bin is deallocated from the memory free list.

13. A memory subsystem comprising:
    a memory comprising a first memory sub-tree and a second memory sub-tree, wherein the first memory sub-tree is a logical group of a first plurality of memory locations of the memory and the second memory sub-tree is a logical group of a second plurality of memory locations of the memory;
    a memory controller to identify a first memory location associated with a first key received at the memory controller, the memory controller comprising:
       a hash calculation unit to:
          determine a first hash value of the first key received at the memory controller; and
          identify the first memory sub-tree associated with the first key based, at least in part, on the first hash value;
       a binary search unit to:
          execute a binary search on the first memory sub-tree to identify the first memory location that comprises a key that matches the first key and first content that corresponds to the matching key; and
       a memory management unit to:
          delete the matching key and the first content from the first memory location of the first memory sub-tree;
          determine that a memory bin comprising a third plurality of memory locations previously allocated from a memory free list to the first memory sub-tree is empty; and
          deallocate the memory bin from the first memory sub-tree to the memory free list.

14. The memory subsystem of claim 13, wherein the memory management unit is further to:

determine a second hash value of a second key received at the memory controller;

identify the second memory sub-tree associated with the second key based, at least in part, on the second hash value;

execute a binary search on the second memory sub-tree to identify a second memory location that matches the second key; and retrieve second content that corresponds to the second key from the second memory location for further processing.

15. The memory subsystem of claim 13, further comprising:

the memory controller to receive a second key, a second content that corresponds to the second key, and an indication that the second key and the second content are to be stored in the memory;

the hash calculation unit to:
determine a second hash value of the second key received at the memory controller;
identify the second memory sub-tree associated with the second key based, at least in part, on the second hash value; and the binary search unit to:
execute a binary search on the second memory sub-tree to identify a second memory location for storing the second key and the second content that corresponds to the second key.

16. The memory subsystem of claim 15, wherein the memory management unit is further to:

determine that the second plurality of memory locations allocated for the second memory sub-tree does not comprise an empty memory location for storing the second key and the second content that corresponds to the second key; and dynamically allocate a second memory bin from the memory free list to the second memory sub-tree.

17. A non-transitory machine-readable storage medium, having instructions stored therein, which, when executed by a processor causes the processor to perform operations that comprise:

determining a first hash value of a first key received at a memory controller of a memory subsystem;

identifying a first memory sub-tree associated with the first key based, at least in part, on the first hash value, wherein the first memory sub-tree is a logical group of a first plurality of memory locations of a memory of the memory subsystem;

executing a binary search on the first memory sub-tree to identify a first memory location that comprises a key that matches the first key and first content that corresponds to the matching key;

deleting the matching key and the first content from the first memory location of the first memory sub-tree;

determining that a memory bin comprising a second plurality of memory locations previously allocated from a memory free list to the first memory sub-tree is empty; and deallocating the memory bin from the first memory sub-tree to the memory free list.

18. The non-transitory machine-readable storage medium of claim 17, wherein the operations further comprise:

determining a second hash value of a second key received at the memory controller;

identifying a second memory sub-tree associated with the second key based, at least in part, on the second hash value;

executing a binary search on the second memory sub-tree to identify a second memory location that matches the second key; and retrieving second content that corresponds to the second key from the second memory location for further processing.

19. The non-transitory machine-readable storage medium of claim 17, wherein the operations further comprise:

receiving a second key, a second content that corresponds to the second key, and an indication that the second key and the second content are to be stored in the memory;

determining a second hash value of the second key;

identifying a second memory sub-tree associated with the second key based, at least in part, on the second hash value; and executing a binary search on the second memory sub-tree to identify a second memory location for storing the second key and the second content that corresponds to the second key.

20. The non-transitory machine-readable storage medium of claim 19, wherein the operations further comprise:

determining that a third plurality of memory locations allocated for the second memory sub-tree does not comprise an empty memory location for storing the second key and the second content that corresponds to the second key; and dynamically allocating a second memory bin from the memory free list to the second memory sub-tree.

* * * * *